US008046836B2

(12) United States Patent
Isokawa

(10) Patent No.: US 8,046,836 B2
(45) Date of Patent: Oct. 25, 2011

(54) METHOD FOR DEVICE QUARANTINE AND QUARANTINE NETWORK SYSTEM

(75) Inventor: Hiromi Isokawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1516 days.

(21) Appl. No.: 11/443,245

(22) Filed: May 31, 2006

(65) Prior Publication Data

US 2007/0118567 A1    May 24, 2007

(30) Foreign Application Priority Data

Oct. 26, 2005    (JP) .................................. 2005-310603

(51) Int. Cl.
G06F 11/00      (2006.01)
G06F 12/14      (2006.01)
G06F 12/16      (2006.01)
G08B 23/00      (2006.01)

(52) U.S. Cl. ........................................... 726/25; 726/23

(58) Field of Classification Search .................... 726/22, 726/23, 24, 25
See application file for complete search history.

(56) References Cited

U.S. PATENT DOCUMENTS

| 6,038,665 | A  | * | 3/2000  | Bolt et al. ............... 713/176 |
| 6,195,677 | B1 | * | 2/2001  | Utsumi ..................... 709/201 |
| 6,920,506 | B2 | * | 7/2005  | Barnard et al. ............ 709/245 |
| 7,093,284 | B2 | * | 8/2006  | Hildenbrand et al. ........ 726/7 |
| 7,237,259 | B2 | * | 6/2007  | Crutcher et al. ............ 726/11 |
| 7,263,609 | B1 | * | 8/2007  | Wante et al. ............... 713/160 |
| 7,266,595 | B1 | * | 9/2007  | Black et al. ............... 709/223 |
| 7,386,888 | B2 | * | 6/2008  | Liang et al. ................. 726/23 |
| 7,443,807 | B2 | * | 10/2008 | Cutler ......................... 370/254 |
| 7,457,302 | B1 | * | 11/2008 | Whitby-Strevens .......... 370/404 |
| 7,496,960 | B1 | * | 2/2009  | Chen et al. .................. 726/22 |
| 7,533,407 | B2 | * | 5/2009  | Lewis et al. .................. 726/6 |
| 7,564,837 | B2 | * | 7/2009  | Komura et al. ............. 370/352 |
| 7,571,460 | B2 | * | 8/2009  | Danforth et al. .............. 726/1 |
| 7,617,533 | B1 | * | 11/2009 | Hernacki ..................... 726/22 |

(Continued)

FOREIGN PATENT DOCUMENTS

JP    2004-289260    10/2004

OTHER PUBLICATIONS

"Special Topic Full Picture of IEEE802.1", Dec. 2004 Issue, Nikkei Network, p. 95.

*Primary Examiner* — David García Cervetti
(74) *Attorney, Agent, or Firm* — Antonelli, Terry, Stout & Kraus, LLP.

(57) ABSTRACT

A network quarantine management system eliminates registration or updating work of a quarantine-exempted device and prevents a fraudulent device from abusing authorized network information registered as a quarantine-exempted device and from impersonation.

When a quarantine management system detects network connection of a new device, the system judges the type (printer, NAS, etc.) of the device by port scanning. The system enables the device to communicate with another device coupled to a business network without an inspection for connecting the device to the business network, if the newly coupled device is judged to be of an authorized type. The device type judgment is conducted whenever a connection is made and is repeatedly conducted after establishment of the connection to check that the type is of an authorized type and, if the type is found to be an unauthorized type, the device is isolated for inspection.

3 Claims, 10 Drawing Sheets

U.S. PATENT DOCUMENTS

| | | | | |
|---|---|---|---|---|
| 7,624,445 | B2* | 11/2009 | Gupta et al. | 726/23 |
| 7,694,343 | B2* | 4/2010 | Sobel et al. | 726/27 |
| 7,734,315 | B2* | 6/2010 | Rathus et al. | 455/569.2 |
| 7,827,607 | B2* | 11/2010 | Sobel et al. | 726/22 |
| 7,835,341 | B2* | 11/2010 | Inujima et al. | 370/349 |
| 7,877,786 | B2* | 1/2011 | van Bemmel | 726/4 |
| 7,917,621 | B2* | 3/2011 | Suzuki et al. | 709/225 |
| 7,924,850 | B2* | 4/2011 | Aoki et al. | 370/395.54 |
| 7,925,737 | B2* | 4/2011 | Hochmuth et al. | 709/224 |
| 2003/0163721 | A1* | 8/2003 | Hildenbrand et al. | 713/200 |
| 2003/0225863 | A1* | 12/2003 | Kajino et al. | 709/219 |
| 2004/0093511 | A1* | 5/2004 | Crutcher et al. | 713/201 |
| 2004/0153665 | A1* | 8/2004 | Browne | 713/201 |
| 2005/0076121 | A1* | 4/2005 | Kortum et al. | 709/225 |
| 2005/0131997 | A1* | 6/2005 | Lewis et al. | 709/203 |
| 2005/0190768 | A1* | 9/2005 | Cutler | 370/395.2 |
| 2005/0267954 | A1* | 12/2005 | Lewis et al. | 709/221 |
| 2005/0273853 | A1* | 12/2005 | Oba et al. | 726/22 |
| 2006/0085850 | A1* | 4/2006 | Mayfield et al. | 726/14 |
| 2006/0174342 | A1* | 8/2006 | Zaheer et al. | 726/23 |
| 2006/0212549 | A1* | 9/2006 | Hokkyo et al. | 709/220 |
| 2006/0256730 | A1* | 11/2006 | Compton | 370/250 |
| 2006/0259967 | A1* | 11/2006 | Thomas et al. | 726/22 |
| 2006/0272014 | A1* | 11/2006 | McRae et al. | 726/12 |
| 2006/0282892 | A1* | 12/2006 | Jonnala et al. | 726/23 |
| 2007/0006312 | A1* | 1/2007 | Li et al. | 726/24 |
| 2008/0040785 | A1* | 2/2008 | Shimada | 726/10 |

* cited by examiner

FIG. 3

2022 DATA OF NETWORK RELAY APPARATUS

| NAME OF DEVICE | IP ADDRESS OF THE DEVICE | LIST OF MANAGEMENT IP ADDRESSES |
|---|---|---|
| ROUTER 1 | 192.168.0.1 | 192.168.0.2~254 |
| SWITCH 1 | 192.168.1.1 | 192.168.1.2~254 |
| ⋮ | ⋮ | ⋮ |

2023 DATA OF USERS LIST

| ACCOUNT NAME | PASSWORD |
|---|---|
| tanaka | passwd1 |
| suzuki | password |
| ⋮ | ⋮ |

2024 DATA OF DEFINITIONS FOR TYPES OF QUARANTINE EXEMPTED DEVICES

| TYPE | PORT NO. FOR WHICH SERVICE IS ESSENTIAL | PORT NO. FOR WHICH SERVICE IS PROHIBITED | PORT NO. FOR WHICH REQUEST IS ESSENTIAL | PORT NO. FOR WHICH REQUEST IS PROHIBITED |
|---|---|---|---|---|
| PRINTER | 515 | ALL PORT EXCEPT THOSE FOR WHICH SERVICE IS ESSENTIAL | N/A | 25,110,443 |
| NAS | 139, 80 | ALL PORT EXCEPT THOSE FOR WHICH SERVICE IS ESSENTIAL | N/A | 80,25,110,443 |
| ⋮ | ⋮ | ⋮ | ⋮ | ⋮ |

2025 MANAGEMENT DATA OF QUARANTINE EXEMPTED DEVICES

| IP ADDRESS | DEVICE STATUS | TYPE | USER |
|---|---|---|---|
| 192.168.0.2 | IN SERVICE | — | — |
| 192.168.0.3 | QUARANTINE NOT REQUIRED | PRINTER | — |
| 192.168.0.4 | IN SERVICE | — | — |
| 192.168.0.5 | OUT OF SERVICE | — | — |
| 192.168.0.6 | QUARANTINE NOT REQUIRED | NAS | — |
| 192.168.0.7 | QUARANTINE NOT REQUIRED | — | tanaka |
| 192.168.0.8 | QUARANTINE NOT REQUIRED | — | suzuki |
| ⋮ | ⋮ | ⋮ | ⋮ |

601  602  603  604

METHOD FOR DEVICE QUARANTINE AND QUARANTINE NETWORK SYSTEM

INCORPORATION BY REFERENCE

This application claims priority based on a Japanese patent application, No. 2005-310603 filed on Oct. 26, 2005, the entire contents of which are incorporated herein by reference.

BACKGROUND

The present invention relates to a method for device quarantine and a quarantine network system, and more specifically to a method for device quarantine and a quarantine network system, the use of which is suitable for reducing labor of an administrator by not executing quarantine on devices such as a printer.

As a result of rapid development of a network society in recent years, network security is becoming major concerns.

Problems associating with network control and information control in an organization include carrying in of laptop computers and use of illegal software. More specifically, connection of a laptop computer infected by a computer virus at a place outside the organization such as a home or on a business trip to the network within the organization causes damage such as spreading of the computer virus and network down. In addition, a case that using banned software in an organization resulted in voluntary or careless disclosure of confidential information of the organization to outside of the company, thus leaking such information has also occurred.

In an attempt to prevent from such damage, it is urged to enhance security of user's client equipment, in addition to conventional measures taken in units of network such as a firewall and an intrusion detection system. As one of new enhancement measures, a quarantine system which restricts a client device in which anti-virus measures are defective or banned software is installed to perform communication is being realized. A purpose of the quarantine system is to prohibit devices that do not conform to organizational policies from being coupled to the network, and the quarantine system is configured by combining the following processing:

(1) Isolation processing: This processing permits connection of a client device only to a specified network until an inspection and therapy of a client device are completed. A client coupled to a network is forcibly connected to a network (quarantine network) designed exclusively for inspection and therapy to check safety. The quarantine network is configured independent from the business network and servers for inspection and therapy, which will be described later, is coupled thereto. The processing is realized when it is associated with network relay devices (a router, a network switch, a gateway, etc.), a DHCP, a personal firewall, etc.

(2) Inspection processing: This processing inspects if the client status conforms to the organizational policies. The inspection server inspects whether or not the client device is infected by virus, the patch is adequate, or fraudulent software is activated, etc. When safety is ensured here in this processing, connection to the business network is permitted.

(3) Treatment processing: This processing executes updating, modification of configurations of a client to satisfy the policy requirements. If a problem is found in the above-stated quarantine, the processing distributes virus definition files and security patches from a therapeutic server and updates a problematic computer. After the therapy processing, the processing performs an inspection again to permit communication through the in-house network.

To realize such quarantine system, software to inspect client status is required for the client device. However, devices which cannot run quarantine software exist such as a printer and NAS (Network Attached Storage). For connection of such devices to a network, it is generally performed to exempt quarantine by pre-registering network information (MAC address, IP address, etc.) of the device concerned in an apparatus to perform isolation processing as a quarantine-exempted device. The Japanese Patent Laid-open No. 2004-289260 discloses a technique to achieve isolation by arranging so that security-unknown devices can be accommodated in a logically closed segment in a system having a DHCP server.

SUMMARY OF THE INVENTION

In a conventional quarantine system, to enable connection of devices such as a printer or NAS which cannot run quarantine software to a network, it is necessary to pre-register network information (MAC address, IP address, etc.) of the device in an apparatus to perform isolation processing as a quarantine-exempted device. In this case, there were problems that man-hours for registering/updating work of a quarantine-exempted device to be carried out on an apparatus for performing isolation processing are totally exerted on a network administrator. In addition, a user cannot use the device immediately since it takes time to register the device. Concerning these problems, items that an administrator should pay attention to security for connecting a printer to a network are stated on page 95, "Special Topic Full Picture of IEEE802.1", December 2004 Issue, Nikkei NETWORK.

Further, as a result of fraudulent use of pre-registered network information of a quarantine-exempted device, "impersonation" connection by a fraudulent device could not be prevented.

The present invention has been devised to solve the above-stated problems and the invention provides a network quarantine management system which eliminates registration/updating work of a quarantine-exempted device by a network administrator on an apparatus for realizing isolation processing. In addition, the present invention provides a network quarantine management system which enables a user to immediately use a device by registering the device by the user. The present invention further provides a network quarantine management system which enables prevention of connection of a fraudulent device registered as a quarantine-exempted device through "impersonation" which fraudulently uses the pre-registered network information.

The present invention executes detection of a quarantine-exempted device, setup processing, and device registration processing by a user. In the device registration processing, after network connection of a new device is detected, type of coupled device (type of a printer, NAS, etc.) is determined. If the device is found to be of an authorized type, the device is registered on a communication permitted device list of an apparatus for performing isolation processing, and quarantine inspection is omitted. In the device type determination processing, quarantine is carried out through port scanning and log auditing to the device. Further, it is also arranged to authenticate a user when a device coupled is registered and enable registration of the device by a user, as a person responsible for the quarantine-exempted device coupled.

Further, the present invention enables to prevent connection of a fraudulent device to the business network through "impersonation" by providing the steps of: performing the above-stated device type determination processing for each connection and repetitively after establishment of the connection; confirming that the type is the authorized type; and, if the type is found not to be the authorized type, removing the device from the communication permitted device list of the apparatus for performing isolation processing, thus disconnecting the device from the network.

More specifically, a quarantine management computer which executes detection of the above-stated quarantine-exempted device is provided, wherein the quarantine management computer determines the type of the device coupled to the quarantine network, and, if the determination reveals that quarantine can be exempted, the computer omits inspection for permitting communication in the business network.

Furthermore, the quarantine management apparatus determines the type of device again in a specified timing for the device for which the inspection was determined to be omitted, and, if the type of device thus determined differs from the type that was determined previously, the apparatus executes the inspection.

In addition, the present invention is characterized that, in the above-stated determination, data is retained in which a service-essential port No. to be used for communication and a service-prohibited port No. to be used for communication are defined in advance for each type of device; the service-essential port No. and the service-prohibited port No. are inspected based on a network address of the device which is coupled to the quarantine network; and the type of the device that is coupled to the quarantine network is determined based on the definitions and the investigation result.

The present invention is further characterized that, in the above-stated determination, data is retained in which a request-essential port which will be the request source for communication and a request-prohibited port which prohibits a request for communication are defined in advance for each type of device; past communication logs of the device coupled to the quarantine network are inspected; and the request statuses of the request-essential port and the request-prohibited are confirmed, thus determining the type of device.

According to the present invention, in a network quarantine management system, it is possible to eliminate work of a network administrator to register or update a quarantine-exempted device in an apparatus for executing the isolation processing. In addition, it becomes possible that a user can immediately use a device by allowing the user to make device registration. Further, it becomes possible to prevent connection of a fraudulent device registered as a quarantine-exempted device through "impersonation" which fraudulently uses the authorized network information.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 illustrates data of a network relay apparatus 2022.

FIG. 4 illustrates data of users list 2023.

FIG. 5 illustrates data of definitions for types of quarantine-exempted devices 2024.

FIG. 6 illustrates the management data of a quarantine-exempted device 2025.

DETAILED DESCRIPTION OF THE EMBODIMENTS

First Embodiment

Hereinafter, a first embodiment according to the present invention will be described with reference to FIGS. 1 through 9.

First, a system configuration according to the embodiment of the present invention will be described with reference to FIGS. 1 and 2.

Figure 1:
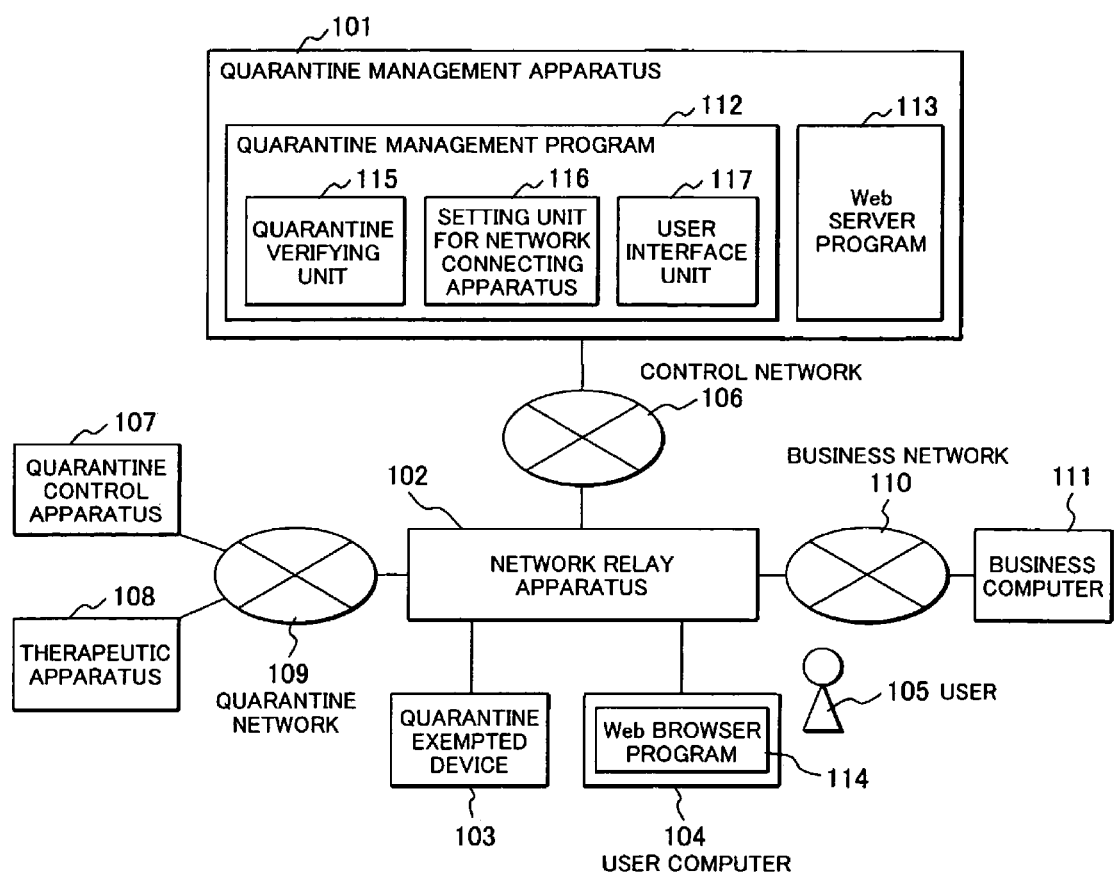
FIG. 1 illustrates a system configuration of a network quarantine management system according to a first embodiment of the present invention.

FIG. 1 is a system configuration diagram illustrating a network quarantine management system according to the first embodiment of the present invention. A network relay apparatus 102 realizes isolation processing for quarantine in addition to regular switching and routing functions, and the apparatus controls access to a control network 106, a quarantine network 109 and a business network 110.

A quarantine management apparatus 101 is coupled to the control network 106. The quarantine management apparatus 101 is a computer which finds out a quarantine-exempted device when realizing a device quarantine method of the embodiment.

A quarantine control apparatus 107 and a therapeutic apparatus 108 are coupled to the quarantine network 109. The quarantine control apparatus 107 is a device to realize inspection processing of device quarantine. The therapeutic apparatus 108 is a device to realize therapeutic processing of device quarantine.

A business computer 111 is coupled to the business network 110. The business computer 111 is a computer to execute primary affairs of an organization.

Further, a user computer 104 and a quarantine-exempted device 103 are coupled to the network relay apparatus 102. The user computer 104 is a computer that is used by a user 105 in an organization. The quarantine-exempted device 103 such as a printer is coupled to the business network 110 without being inspected due to the character thereof.

A quarantine management program 112 and a web server program 113 will run in the quarantine management apparatus 101.

The quarantine management program 112 realizes a quarantine verifying unit 115, a setting unit for network relay apparatus 116 and a user interface unit 117. The quarantine verifying unit 115 executes inspection to find out whether quarantine of a device can be exempted or not. The setting unit for network relay apparatus 116 sets up quarantine-exempted devices in the network relay apparatus 102. The user interface unit 117 provides a user interface when a user registers a quarantine-exempted device.

Further, a web browser program 114 is running in the user computer 104, thus providing a user interface of a web page.

Figure 2:
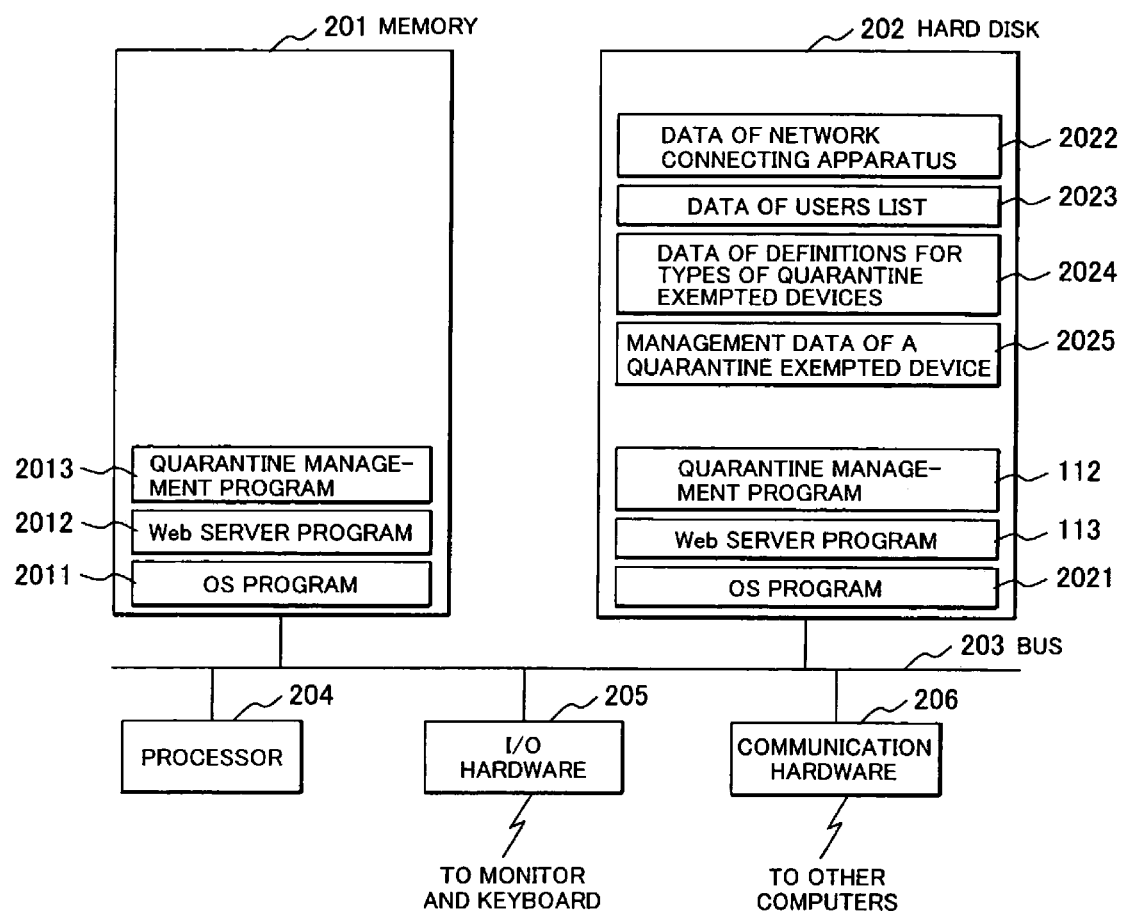
FIG. 2 illustrates a hardware configuration as well as a program and data of a quarantine management apparatus 101.

FIG. 2 is a diagram illustrating a hardware configuration and an internal program and data thereof of the quarantine management apparatus 101.

The quarantine management apparatus 101 includes a memory 201, a hard disk 202, an internal communication line such as a bus 203, a processor 204, an I/O hardware 205 and communication hardware 206. The processor 204 is a device to execute a program. The hard disk 202 is an auxiliary memory device in which programs and data are stored. The memory 201 is a storage area in which programs to be executed are stored and data is temporarily stored. The I/O hardware 205 is a device to control outputs to the monitor unit and inputs from the keyboard. The communication hardware 206 is a device to control a network line with another computer.

A program to realize a device quarantine method for each embodiment and various kinds of data are stored in the hard disk 202. An OS (Operating System), a program 2021, the quarantine management program 112 and the web server program 113 are stored as programs. Data of network relay apparatus 2022, data of users list 2023, data of definitions for types of quarantine-exempted devices 2024 and management data of a quarantine-exempted device 2025 are stored as data.

The data of the network relay apparatus 2022 is date for retaining a list of network relay apparatuses for which isolation processing is applied. The data of users list 2023 is date for retaining a list of users who register a quarantine-exempted device. The data of definitions for types of quarantine-exempted devices 2024 is data for retaining list of quarantine-exempted device types. The management data of a quarantine-exempted device 2025 is data for retaining list of quarantine-exempted devices.

In the memory 201, the OS program 2021 located on the hard disk 202 is loaded to the OS program domain 2011 and executed. The OS program 2011 executes control of the I/O hardware 205 and the communication hardware 206 and data loading from the hard disk 202. Further, the OS program 2011 loads from the hard disk 202 and executes the quarantine management program 112 to 2013 of the memory 201 and the web server program 113 to 2012 of the memory 201, respectively.

Each of the above-stated programs may be stored in the above-stated auxiliary memory device in advance, or it may be introduced to the auxiliary memory device from another device as required via the I/O hardware 205 or the communication hardware 206 and a medium that can be used by the above-stated computer. The medium means, for example, a memory medium or a communication medium (i.e. a network to be coupled to the communication hardware 206, or a carrier wave and digital signals that are transmitted in a network) which is removable from the I/O hardware 205.

Next, data structure of a network management system according to the fist embodiment of the present invention will be described with reference to FIGS. 3 to 6.

FIG. 3 is a diagram illustrating data of a network relay apparatus 2022.

FIG. 4 is a diagram illustrating data of users list 2023.

FIG. 5 is a diagram illustrating data of definitions for types of quarantine-exempted devices 2024.

FIG. 6 is a diagram illustrating management data of a quarantine-exempted device 2025.

The data of a network relay apparatus 2022 includes fields of a name of device 301, an IP address of device 302 and a list of management IP addresses 303.

The name of device 301 is a field in which an identifier of a network relay apparatus is stated. The IP address of device 302 is a field in which an IP address of a device associated with the name of device 301 is stated. The list of management IP addresses 303 is a field in which a list of IP addresses to be managed associated with the name of device 301 is stated. More specifically, an address that could be an IP address of a device with which a device such as a router or a switch communicates is stored.

A network administrator of the name of device 301 is required to set up a list of network relay apparatuses and a list of IP addresses in advance in this data.

The data of users list 2023 includes fields of an account name 401 and a password 402.

The account name 401 is a field in which an identification name of a user is stated. The password 402 is a field in which a password that is associated with the account name 401 is stated. A network administrator is required to set up a user in an organization who should be authorized to add or delete a quarantine-exempted device in advance in this data.

The data of definitions for types of quarantine-exempted devices 2024 includes, as shown in FIG. 5, fields of: a type 501; a port No. for which service is essential 502; a port No. for which service is prohibited 503; a port No. for which request is essential 504; and a port No. for which request 505 is prohibited.

The type 501 is a field in which an identifier of the type of a quarantine-exempted device.

The port No. for which service is essential 502 is a field in which a port No. for which service is essential is stated according to a device type associated with the type 501. The service-essential port No. is a port that is opened by necessity at the time of executing communication, whenever the device of this type is providing service.

The port No. for which service is prohibited 503 is a field in which a port No. for which service is essential is stated according to a device type associated with the type 501. The service-prohibited port No. is a port that is prohibited to be opened at the time of executing communication, whenever the device of this type is providing service.

The port No. for which request is essential 504 is a field in which a port No. for which service is essential is stated according to a device type associated with the type 501. The port for which request is essential is a port that is a request destination by necessity at the time of executing communication, whenever the device of this type is requesting service as a client to another device.

The port No. for which requested is prohibited 505 is a field in which a port No. for which service is prohibited is stated according to a device type associated with the type 501. The request-prohibited port is a port that is prohibited to be the request destination at the time of executing communication, whenever the device of this type is requesting service as a client to another device.

The service-essential port No. and the service-prohibited port No. can be obtained by applying port scanning direct to the device. In addition, the port for which request is essential and the request-prohibited port can be found out by referring to logs of the device.

The management data of a quarantine-exempted device 2025 includes, as shown in FIG. 6, fields of an IP address 601, device status 602, a type 603 and a user 604.

The IP address 601 is a field in which an IP address to be managed is stated. The device status 602 is a field in which status of a device associated with the IP address 601 is stated. For running status, values such as "in service" which indicates that the device requires quarantine and is running, "out of service" which indicates that the device is not running, and "quarantine not required" which indicates that the device does not require quarantine and is running are entered. The type 603 is a field in which a type of device associated with the IP address 601 is stated. The user 604 is a field in which a user who registers "quarantine not required" for a device associated with the IP address 601 is stated.

Referring to FIG. 6, the type 603 is set to be "quarantine not required" for a "printer" and "NAS". On the other hand, the device status 602 is set to be "quarantine not required" for the device wherein the users 604 are "tanaka" and "suzuki."

Next, processing of the network management system according to the embodiment of the present invention will be described with reference to FIGS. 7 to 9, in addition to the above-stated FIG. 1.

Figure 7:
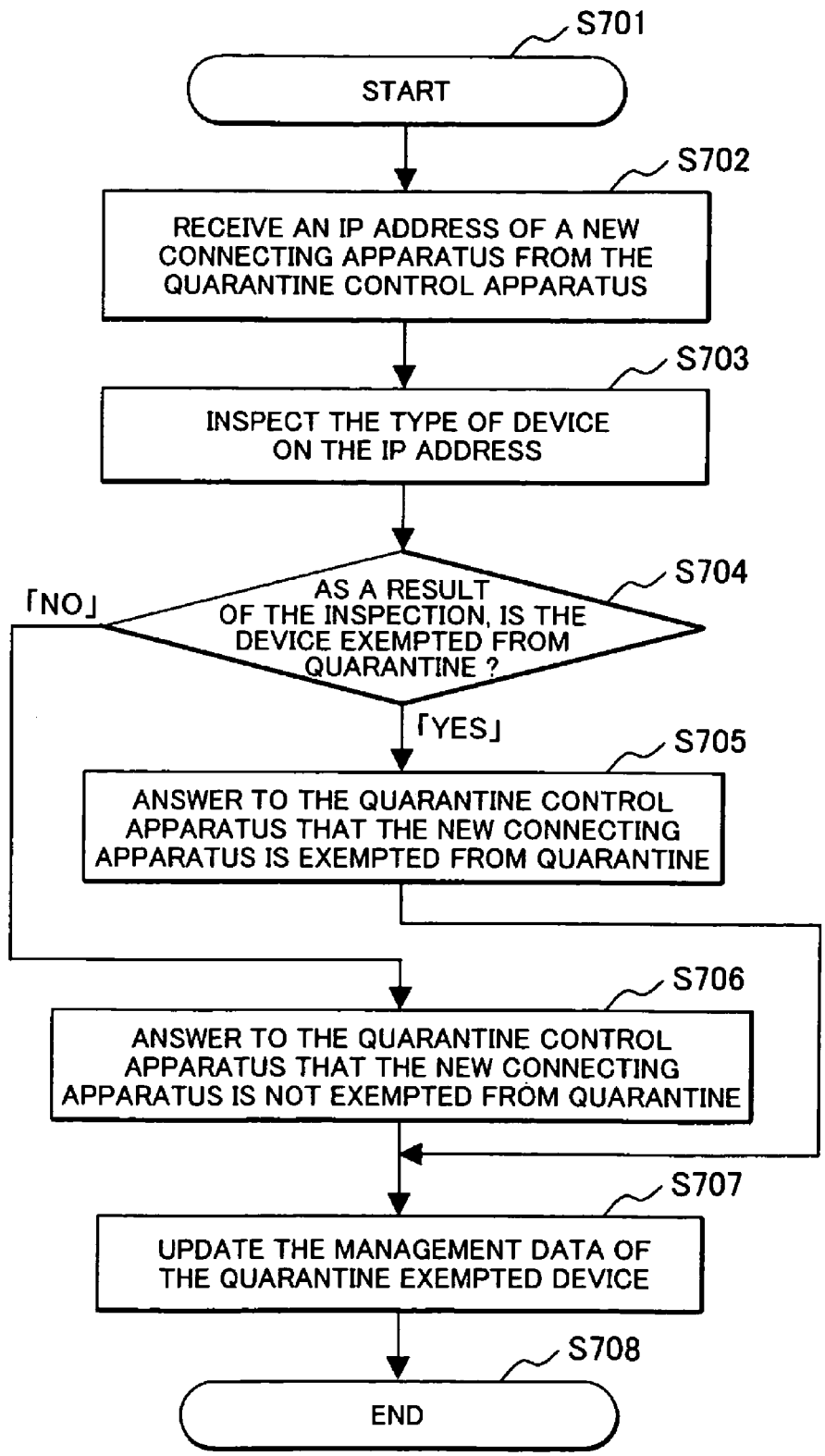
FIG. 7 is a flowchart illustrating quarantine necessity judging processing which is executed when a new device is coupled to a network relay apparatus.

FIG. 7 is a flowchart illustrating quarantine necessity judging processing which is executed when a new device is coupled to a network relay apparatus.

Figure 8:
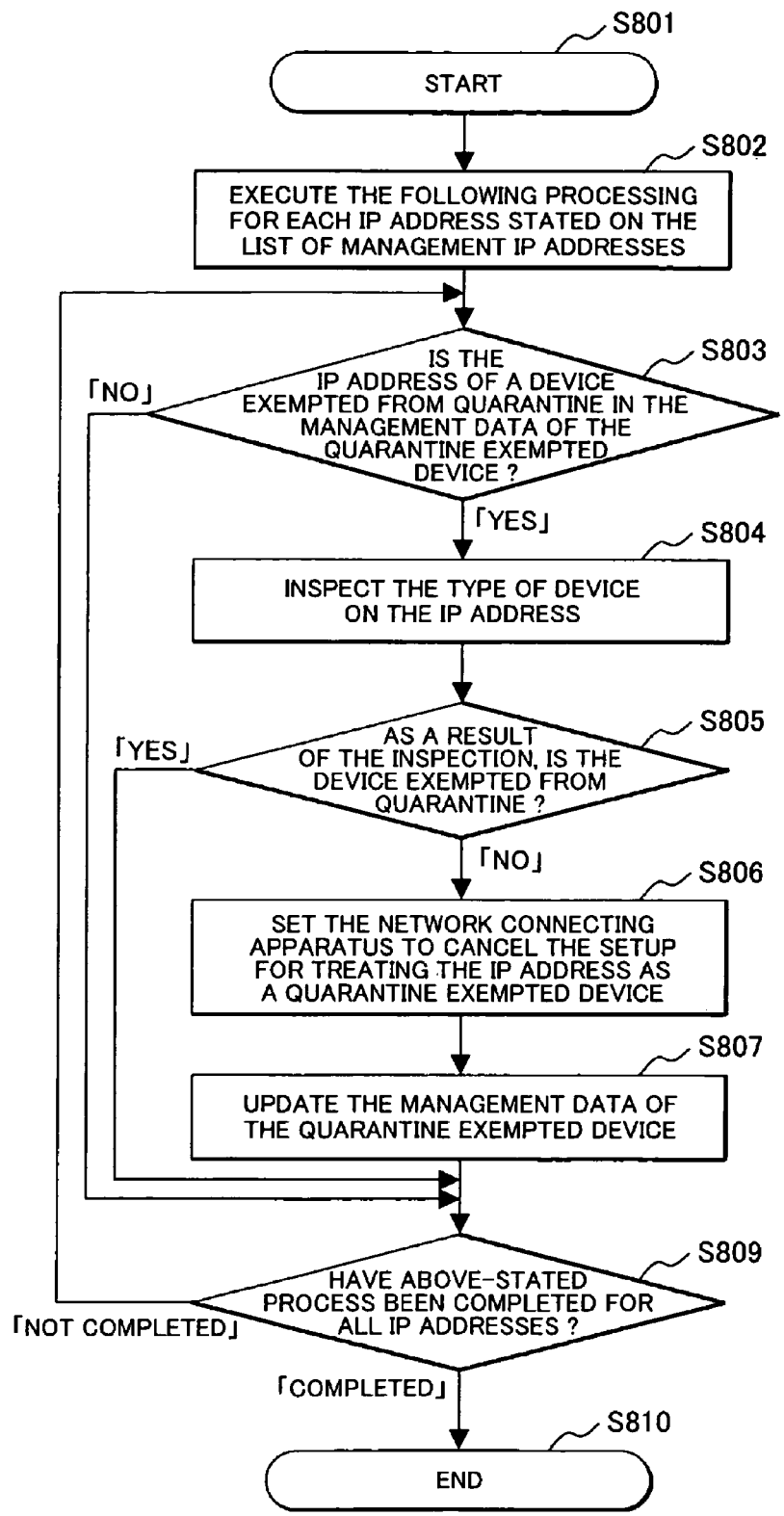
FIG. 8 is a flowchart, regarding a quarantine-exempted device 103, illustrating quarantine necessity judging processing for the quarantine-exempted device to be executed after the device has been coupled to a business network.

FIG. 8 is a flowchart illustrating quarantine necessity judging processing for the quarantine-exempted device 103 to be executed after the device has been coupled to a business network.

Figure 9:
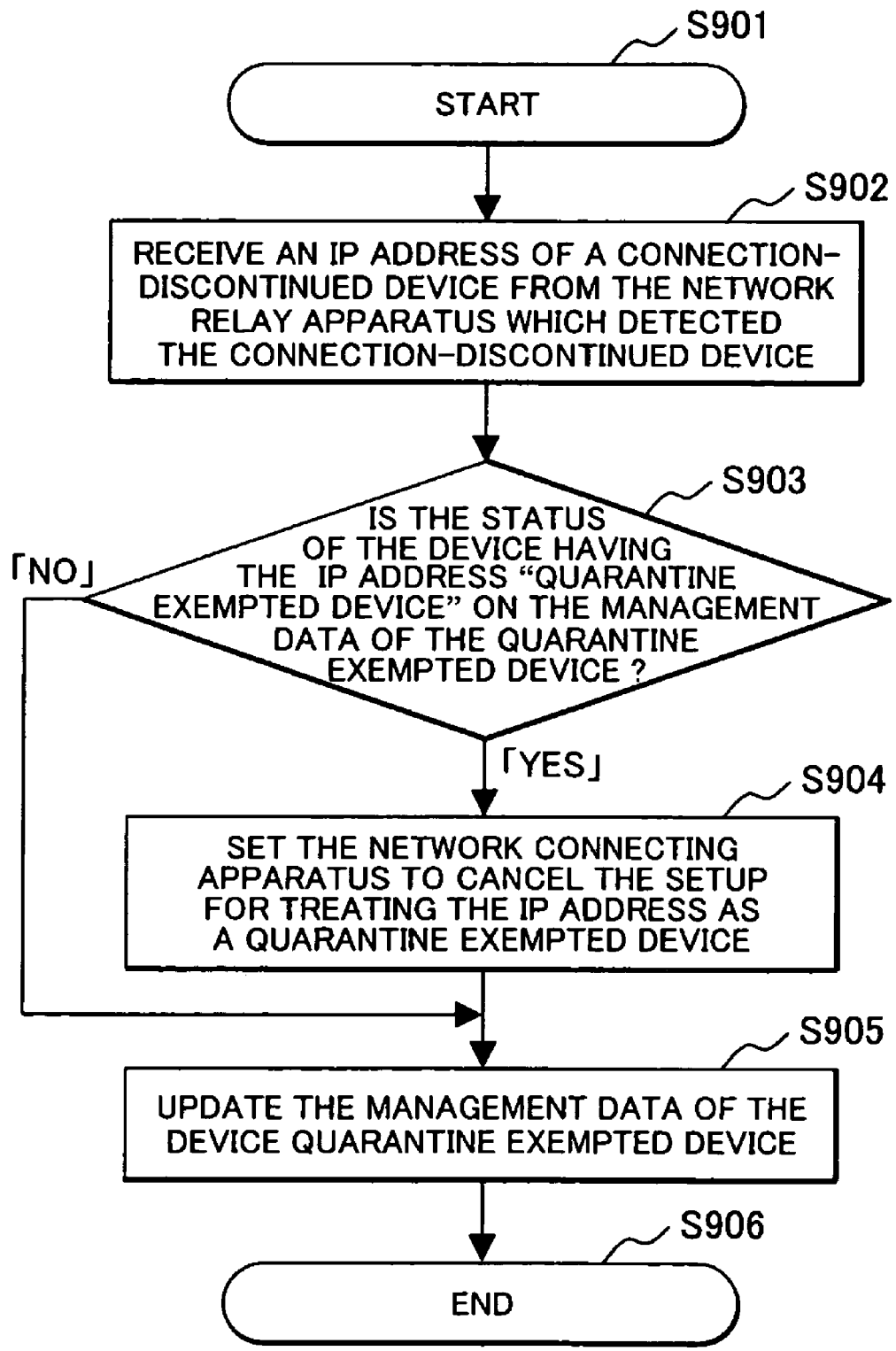
FIG. 9 is a flowchart illustrating processing for invalidating quarantine exemption setup to be executed when a device is uncoupled.

FIG. 9 is a flowchart illustrating processing for invalidating quarantine exemption setup to be executed when a device 103 is uncoupled.

In a system that is configured as stated above, when an ordinary client device in an organization like the user computer 104 used by the user 105 in the organization is coupled to the network relay apparatus 102, the client device quarantine processing is executed through linked operations among a program which inspects status in the client device, the network relay apparatus 102, the quarantine control apparatus 107, and the therapeutic apparatus 108.

The network relay apparatus 102 restricts the client device to communicate only through the quarantine network before executing quarantine, and executes access control, after completing quarantine, so that the client device can communicate also with a device that is coupled to the business network. More specifically, access information (IP address, password, etc.) to the quarantine control apparatus 107 used as a device authentication server will be registered in the network relay apparatus 102 in advance. When a new device is coupled, the network relay device 102 requests device authentication to a registered device authentication server, and executes control such as packet filtering so that the new device can communicate only through the quarantine network until device authentication is completed. For an authentication protocol between the network relay apparatus 102 and the quarantine control apparatus 107, RADIUS (Remote Authentication Dial In User Service) may be used, for example.

It should be noted that the embodiment illustrates a method for linkage with network relay apparatuses such as a network switch, a router, a gateway, a firewall, or a wireless access point as apparatuses that realize isolation processing. However, the present invention is not limited to these apparatuses, and it can be applied also to a quarantine system that is realized by using DHCP, a personal firewall, etc.

When a machine such as a printer which cannot run a program to inspect status in a client device is coupled, the network relay apparatus 103 temporarily reject the connection. Devices that cannot run a program to inspect status in a client device basically cover those devices that run with built-in software, including a printer, NAS, a multifunction machine (for printing, scanning, copying, fax and etc.), PDA, a wireless access point, an IP telephone, a network projector, a whiteboard, a virtual device and a network home electric appliance. With the embodiment, such devices can be handled as quarantine-exempted devices.

Thereafter, the quarantine management apparatus 101 recognizes the newly coupled device, determines the device type of the quarantine-exempted device 103 for connection authentication, and modifies setups of the network relay apparatus 102, thus enabling network connection of the quarantine-exempted device 103. With such arrangement, it becomes possible for the quarantine-exempted device 103 to communicate with the device coupled to the business network.

The processing illustrated in FIG. 7 is processing to be realized by the quarantine management program 112 of the quarantine management apparatus 101, wherein the processing is executed by the quarantine management apparatus 101 when the network relay apparatus 102 detects a newly coupled device and transmits an address thereof to the quarantine management apparatus 101.

First, when a device is newly coupled to a network relay apparatus, the network relay apparatus 102 requests the quarantine control apparatus 107 for device authentication. When a network request is executed, the network relay apparatus 102 transmits network information (an IP address or an MAC address) of the newly coupled device to the quarantine control apparatus 107. The quarantine control apparatus 107, when the received network information of the newly coupled device is an MAC address, requires an IP address of the device by using RARP (Reverse Address Resolution Protocol), etc. Then, the quarantine control apparatus 107 transmits the IP address to the quarantine management apparatus 101, thus requiring confirmation whether the device is a quarantine-exempted device or not.

In the quarantine management apparatus 101, as illustrated in FIG. 7, the quarantine management program 112 receives the IP address of the newly coupled device from the quarantine control apparatus 107 (S702). Then, the quarantine management program 112 inspects the type of device for the IP address (S703). The inspection of the type of device is executed by executing a connection test (port scanning) on port Nos. for which service is essential and port Nos. for which service is prohibited of all types of the data of definitions for types of quarantine-exempted devices 2024 to determine that, when connection is possible to all ports stated on the port No. for which service is essential, and connection is not possible to all port Nos. for which service is prohibited, the data is of the adequate quarantine-exempted type.

As a result of the type inspection, when the device is found to be a quarantine-exempted device (S704), the result is returned to the quarantine control apparatus 107 (S705). In this case, the quarantine control apparatus 107 answers to the network relay apparatus 102 that the newly coupled device has been quarantined, and the network relay apparatus 102 executes setting up to handle the newly coupled device having the above-stated IP address as a quarantine-exempted device, or more specifically, to cancel the access control such as packet filtering (S705). This allows connection of the newly coupled device to the business network. As a result, the newly coupled device can be communicated with other devices coupled to the business network.

As a result of the inspection, if the newly coupled device is not a quarantine-exempted device (S704), the result is returned to the quarantine control apparatus 107 (S706). In this case, the quarantine control apparatus 107 regards the newly coupled device as a device to be quarantined and subjects it to regular quarantine processing.

Thereafter, the result of inspection thus executed is reflected on the content of the management data of a quarantine-exempted device 2025 (S706). More specifically, as a result of the inspection, when the device status associated with the IP address is found to be that quarantine is not required, "quarantine not required" is stated, and the type is modified to the type that was proven as a result of the inspection. When the device status is found to be that quarantine is not "quarantine not required", or in other words, quarantine is required as usual, the device status is modified to "in service."

Further, the quarantine management apparatus 101 repetitively inspects the type of quarantine-exempted device, and, when it judges that the type is different, the quarantine management apparatus 101 modifies setting of the network relay apparatus 102 to disable the network connection of the quarantine-exempted device 103. This arrangement is provided to prevent that a malicious user tries to couple the network in the status of "impersonation" by faking up an IP address.

It should be noted that, with the embodiment, it is configured that device quarantine including detection of a quarantine-exempted device is executed through the steps of: registering the quarantine control apparatus 107 as the request destination of device authentication of the network relay apparatus 102; and allowing the quarantine control apparatus 107 to perform operation linked with the quarantine management apparatus 101. However, it may be configured differently to perform device quarantine including detection of a quarantine-exempted device through the steps of: registering also the quarantine management apparatus 101 as the request destination of device authentication of the network relay apparatus 102; and, when a new device is coupled, access control of the newly coupled device is executed based on the results of both the device authentication by the quarantine management apparatus 102 and the device authentication by the quarantine control apparatus 107.

Next, the quarantine necessity judging processing which is repeatedly executed by the quarantine management apparatus 101 for the quarantine-exempted device 103 after the device is coupled to the business network will be described.

A series of processing shown in FIG. 8 is executed by the quarantine management program 112 included in the quarantine management apparatus 101 and is repeatedly executed by the quarantine management program 112 in parallel with communication with the business network by the quarantine-exempted device 103.

The processing is realized by executing processing S803 to S807 illustrated in FIG. 8 for each IP address stated on the list of management IP addresses of the data of network relay apparatus 2022 (S802, S809).

First, by referring to records of the management data of a quarantine-exempted device 2025, it is confirmed that the status to the IP address is not "quarantine not required" and the type is not "–" (S803). When the status is not "quarantine not required" and the type is not "–", an inspection for device type is executed to the device having the IP address (S804). More specifically, for the 6th and the 7th record shown in FIG. 8, device quarantine will not be executed as designated by a user.

For the device type inspection, an audit on logs that are acquired form a network relay apparatus is executed in S703, in addition to a connection test on service port Nos. that is also executed for quarantine-exempted device registration processing. Regarding the logs which indicated a request that is output after the previous audit from the IP address, logs on the port No. for which request is essential and the port No. for which request is prohibited in association with the type stated on the data of definitions for types of quarantine-exempted devices 2024 are inquired, and, when connection-requested logs exist in all of the port Nos. for which request is essential and the logs do not exist in all of the ports stated in the port No. for which request is prohibited, the device is judged to be of the adequate type of quarantine-exempted device.

As described above, by inspecting the port for which request is essential and the request-prohibited port, it becomes possible to prevent that a malicious user, using a fake IP address, makes a fraudulent request to a device coupled to the business network by, for example, connecting a notebook computer for the IP address of "printer" for the type 603.

When the type inspection reveals that the device is not of the type of quarantine-exempted device, the network relay apparatus 102 is set to cancel the setup for treating the IP address as a quarantine-exempted device (S806), and the device status of the IP address concerned of the management data of a quarantine-exempted device 2025 is updated to "in service" and the type to "–", respectively (S807).

Next, quarantine exemption setup invalidation processing at the time of device disconnection will be described with reference to FIG. 9.

The quarantine management apparatus 101, when a quarantine-exempted device is uncoupled from a network, sets up in the network relay apparatus 102 to cancel the setup to treat the quarantine-exempted device as a quarantine-exempted device concerning the quarantine-exempted device.

The quarantine exemption setup invalidation processing at the time of device disconnection means the flowchart of quarantine exemption setup invalidation processing to be executed when a device is uncoupled which is executed by the quarantine management program 112 of the quarantine management apparatus 101. The processing is executed by the quarantine management apparatus 101 when the network relay apparatus 102 detects network disconnection of a device and transmits the address of the device to the quarantine management apparatus 101.

As shown in FIG. 9, the quarantine management program 112 first receives the IP address of the uncoupled device from the network relay apparatus 102 (S902). Then, by referring to the management data of a quarantine-exempted device 2025, when the status of the device having the IP address is "quarantine not required" (S903), the quarantine management program 112 sets the network relay apparatus 102 to cancel the setting to treat the IP address as a quarantine-exempted device (S904). Finally, the quarantine management program 112 modifies the device status associated with the IP address of the management data of a quarantine-exempted device 2025 to "out of service" (S905).

It should be noted that, with the embodiment, an IP address is used as a network address to identify a device. However, other addresses such as an MAC address may be used. Further, although for the IP address, a Pv4-base IP address is used, the embodiment can be realized by using the IP address of other versions such as IPv6.

According to the embodiment, the following effects concerning device quarantine are obtained:

First, by detecting a quarantine-exempted device and setting the quarantine-exempted device in a network relay apparatus which is a device to realize isolation processing, registration/updating work of quarantine-exempted device that were conventionally required to be performed by a network administrator becomes unnecessary. In addition, by repeatedly executing inspections of quarantine-exempted devices, it becomes possible to prevent connection of a fraudulent device through "impersonation" where authorized network information registered is abused.

Second Embodiment

Hereinafter, a second embodiment according to the present invention will be described with reference to FIG. 10, in addition to FIGS. 1 to 9.

Figure 10:
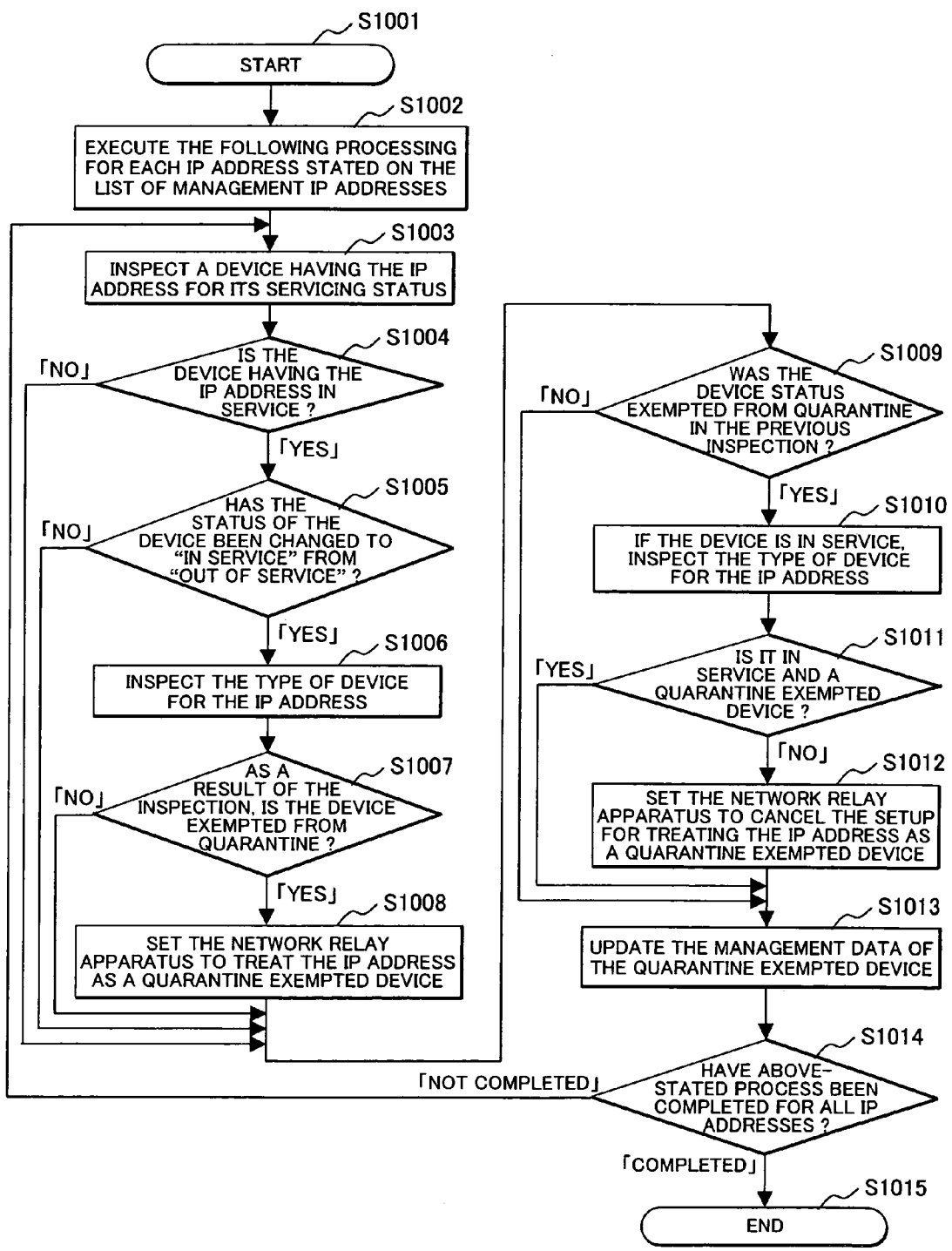
FIG. 10 is a flowchart illustrating the operation of quarantine management processing according to a second embodiment of the present invention.

FIG. 10 is a flowchart illustrating operation of quarantine management processing according to the second embodiment of the present invention.

The processing sequence of the quarantine management program 112 which was described with reference to FIGS. 7 to 9 of the above-stated first embodiment can be used when the network relay apparatus 102 detects new connection and disconnection of a device and the address of the device can be notified to a quarantine management apparatus. However, even when the address cannot be notified, the sequence can be realized by enabling the quarantine control program 112 to detect new connection and disconnection of a device. In this case, operation of the quarantine management processing is like the one illustrated in FIG. 10. The processing is repeatedly executed by the quarantine management apparatus 101.

The quarantine management processing is realized by executing processing S1003 to S1013 to each IP address stated on the list of management IP addresses of data of the network relay apparatus 2022 (S1002, S1014).

First, by executing a ping command, etc. to the IP address, the servicing status whether a device associated with the IP address is operating or not is inspected (S1003). When the device is in service, the quarantine-exempted device registration processing (S1005 to S1008) is executed (S1004). In the quarantine-exempted device registration processing, first, the previous servicing status of the IP address is confirmed by referring to the device status 602 of the management data of a quarantine-exempted device 2025, and, when the previous service status is "in service" or "in quarantine status", the quarantine-exempted device registration processing will not be executed (S1005). When the status changed from "out of service" to "in service", the device type is inspected for the device having the IP address (S1006). The device status inspection is executed through the steps of: executing connection tests on port No. for which service is essential and port No. for which service is prohibited; and, when the device can be coupled to all of the ports stated on the port No. for which service is essential and cannot be coupled to all of the ports stated on the port No. for which service is prohibited, judging that the device is of the adequate type of quarantine-exempted device. When the type inspection revealed that the device is a quarantine-exempted device, the network relay apparatus 102 is set to treat the device having the IP address as a quarantine-exempted device (S1007, S1008).

Next, when the previous inspection revealed that the device status of the device is "quarantine not required" and the type is not "–" according to information of the management data of the quarantine-exempted device 2025, the quarantine-exempted device cancel processing (S1010 to S1012) is executed (S1009). In the quarantine-exempted device cancel processing, first, when a device is in service, device type inspection is executed for the IP address (S1010). For the device type inspection, an audit for logs that are acquired from a network relay apparatus is executed in addition to connection tests to service port No. that is also executed for the quarantine-exempted device registration processing. Regarding the logs which indicated a request that is output after the previous audit from the IP address, logs on the port No. for which request is essential and the port No. for which request is prohibited in association with the type stated on the data of definitions for types of quarantine-exempted devices 2024 are inquired, and, when connection-requested logs exist in all of the port Nos. for which request is essential and the logs do not exist in all of the ports stated in the port No. for which request is prohibited, the device is judged to be of the adequate type of quarantine-exempted device. When the inspection result revealed that the type is not of the type of quarantine-exempted device or when the device is set to "out of service", the network relay apparatus 102 is set to treat the device having the IP address as a quarantine-exempted device (S1011, S1012).

Finally, the result of inspection thus executed is reflected on the content of the management data of a quarantine-exempted device 2025 (S1013). More specifically, values for the status and the device type are modified.

Third Embodiment

Next, a third embodiment according to the present invention will be described with reference to FIGS. 11 and 12, in addition to FIG. 1 to 10.

Figure 11:
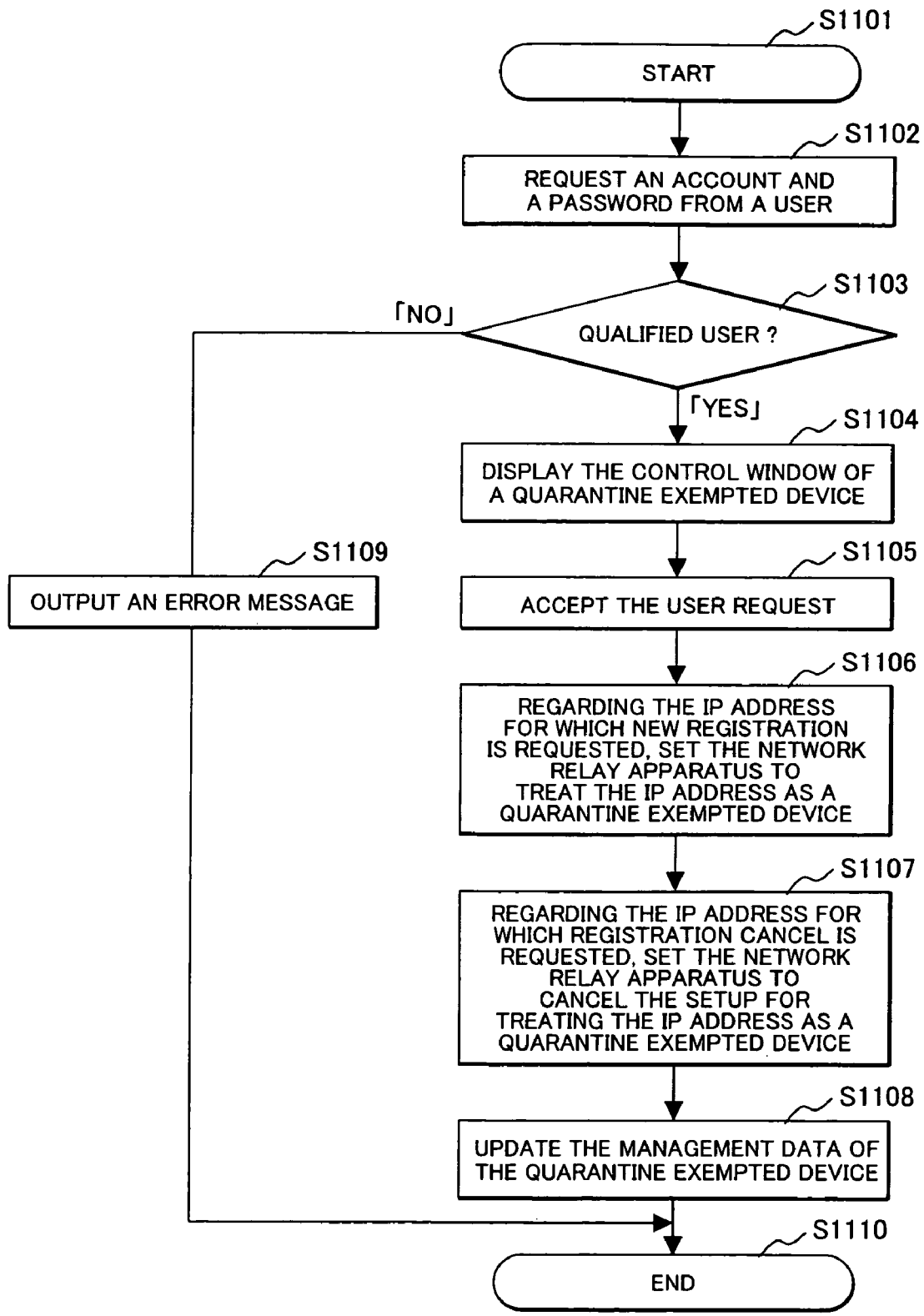
FIG. 11 is a flowchart illustrating the operation of a user interface processing for registering a quarantine-exempted device.

FIG. 11 is a flowchart illustrating operation of user interface processing for registering a quarantine-exempted device.

Figure 12:
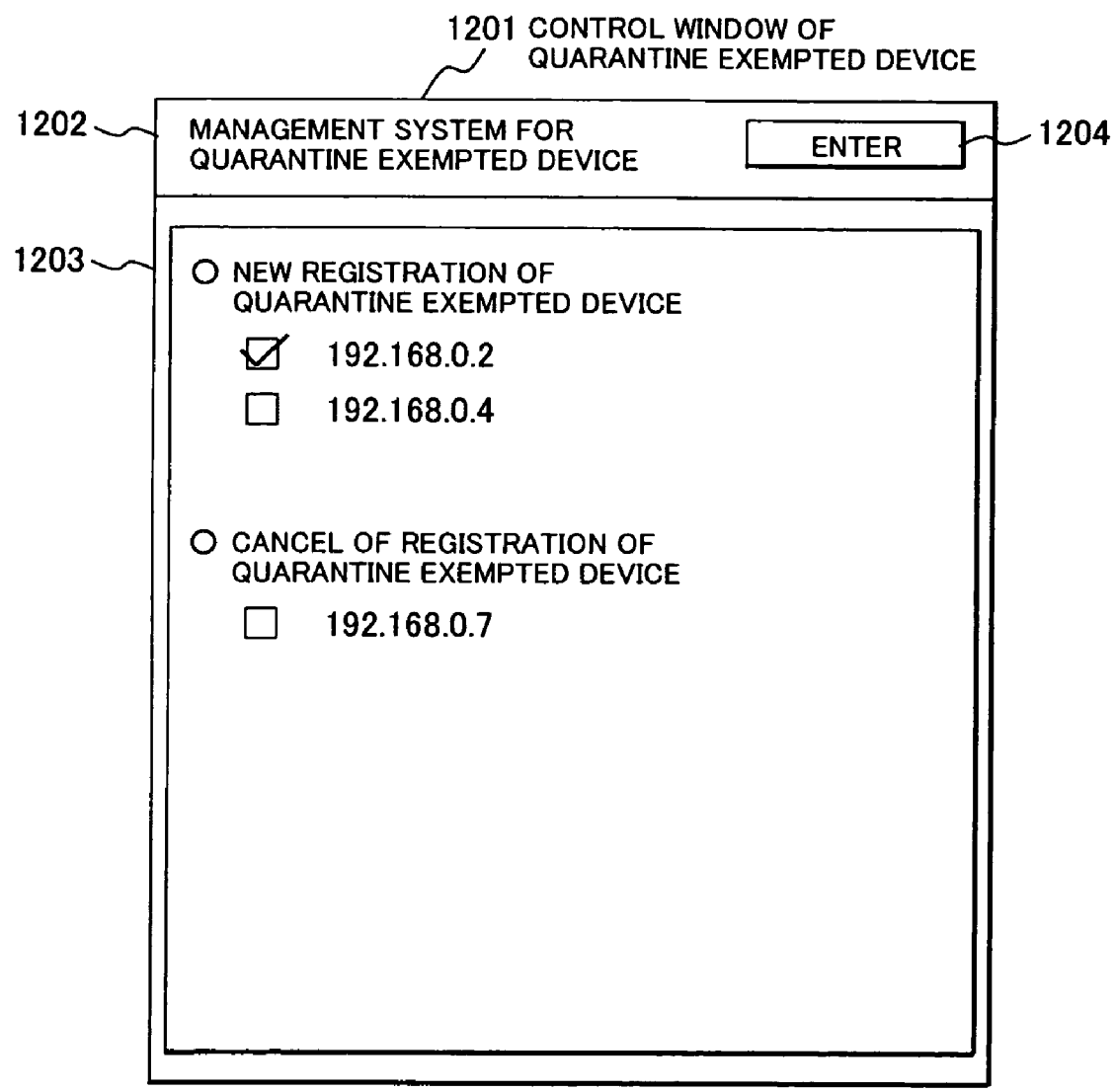
FIG. 12 is a diagram illustrating a control window of a quarantine-exempted device.

FIG. 12 is a diagram illustrating a control window of quarantine-exempted device.

With the embodiment, it will be arranged that a quarantine-exempted device can be registered upon having a request from a user when the user wishes to use the quarantine-exempted device immediately. For this purpose, the quarantine management apparatus 101 provides a user interface for registering quarantine-exempted device through the web server program 113. The user 105 can access the user interface provided by the quarantine management apparatus 101 by using the web browser program 114 of the user computer 104.

The user interface processing for registering quarantine-exempted device is processing to be executed by the quarantine management apparatus 101.

As shown in FIG. 11, first, the user interface processing requires a user account and a password from the user (S1102). By comparing the account name and the password thus received with the data of users list 2023, the processing judges whether the user is a qualified user or not.

When the user is found not to be a qualified user (S1103), an error message is output (S1109) and the registration processing is terminated.

When the user is a qualified user (S1103), the control window of quarantine-exempted device 1201 shown in FIG. 12 is displayed (S1104).

The user registers or cancels the quarantine-exempted device by using the window. The control window of quarantine-exempted device 1201 includes a title display area 1202, a user request input area 1203 and an enter button 1204 which initiates search after the user request is entered.

In the user request input area 1203 on the control window of quarantine-exempted device 1201 shown in FIG. 12, an area in which a quarantine-exempted device to be newly registered by using a check button and an area to designate a quarantine-exempted device whose registration is to be cancelled by using a check button are displayed. The user, after ticking the button for a device to be registered or cancelled, clicks the enter button 1204 with a pointing device such as a mouse.

Next, the user interface processing accepts a user request that was entered on the control window of quarantine-exempted device 1201 (S1105). Regarding the IP address that was requested for new registration, the processing sets the network relay apparatus to treat the device having the IP address as a quarantine-exempted device (S1106). On the other hand, regarding the device having the IP address for which registration cancel is requested, the processing sets the network relay apparatus to cancel the setup for treating the IP address as a quarantine-exempted device (S1107).

Finally, the result of setup on the quarantine-exempted device that was executed according to the user request is reflected in the content of the management data of the quarantine-exempted device 2025 (S1108). More specifically, values for the status and the user are modified.

According to the embodiment, by providing the user with an interface to register a quarantine-exempted device, it becomes possible for the user to use the device immediately.

It should be noted that, for registration of a quarantine-exempted device according to the embodiment, it can also be configured that determination of type that is not required will be executed along with device registration by user, and the quarantine-exempted device registration processing will be executed only when both of the type determination and the user registration are established. In this case, the configuration is effective in restricting connection of a fraudulent device performed by impersonation where authorized network information is abused.

The specification and drawings are, accordingly, to be regarded in an illustrative rather than a restrictive sense. It will, however, be evident that various modifications and changes may be made thereto without departing from the spirit and scope of the invention as set forth in the claims.

I claim:

1. A device quarantine method, applied for a quarantine network and a business network, for inspecting a device that is intended to be connected to the business network, the method comprising:
   storing data of definitions for types of quarantine-exempted devices and management data of a quarantine-exempted device to a storage device;
   connecting the device which is intended to be connected to the business network to the quarantine network;
   acquiring information of the device connected to the quarantine network;
   executing a connection test on ports of the device connected to the quarantine network;
   determining whether the type of the device is quarantine-exempted or not based on the data of definitions for types of quarantine-exempted devices and the acquired information of the device;
   when the determination result in the determining indicates that the type of the device is quarantine-exempted, updating the management data of a quarantine-exempted device to allow communication in the business network;
   enabling connection to the business network based on the updated management data of a quarantine-exempted device; and
   wherein the data of definitions for types of quarantine-exempted devices includes information of request-essential ports which is designated as a request destination for communication and request-prohibited ports for which a request is prohibited for communication for each type of devices,
   the method further comprising:
   acquiring the communication log of the device omitting an inspection to allow communication in the business network continuously;
   comparing the communication log and the information of request-essential ports and request-prohibited ports; and
   when there exists no log event in the communication log that the device requests communication to the business network with one of the request-essential ports, or there exists the log event in the communication log that the device requests communication to the business network with one of the request-prohibited ports, canceling the setup that the device is dealt as quarantine-exempted.

2. A device quarantine method, applied for a quarantine network and a business network, for inspecting a device that is intended to be connected to the business network, the method comprising:
   storing data of definitions for types of quarantine-exempted devices and management data of a quarantine-exempted device to a storage device;
   connecting the device which is intended to be connected to the business network to the quarantine network;
   acquiring information of the device connected to the quarantine network;
   executing a connection test on ports of the device connected to the quarantine network;
   determining whether the type of the device is quarantine-exempted or not based on the data of definitions for types of quarantine-exempted devices and the acquired information of the device;
   when the determination result in the determining indicates that the type of the device is quarantine-exempted, updating the management data of a quarantine-exempted device to allow communication in the business network;
   enabling connection to the business network based on the updated management data of a quarantine-exempted device; and
   registering information of the device connected to the business network and information as to quarantine-needed or quarantine-exempted by a user; and
   storing the information of the device connected to the business network and the information as to quarantine-needed or quarantine-exempted to the storage device.

3. A quarantine management system connecting a quarantine network and a business network, for inspecting a device that is intended to be connected to the business network, the system comprising:
   an isolation means for isolating the device such that the device communicates only in the quarantine network, and not in the business network;
   a quarantine means for quarantining the device for communicating in the business network, and enabling the quarantine-exempted device to communicate in the business network; and
   a determination means for determining whether quarantine of the device for communicating in the business network is needed or not,
   and the determination means comprises:
   a storage means for storing data of definitions for types of quarantine-exempted devices and management data of a quarantine-exempted device to a storage device;
   a device inspection means for executing a connection test on ports of the device connected to the quarantine network, and for determining whether the type of the device is quarantine-exempted or not based on the data of definitions for types of quarantine-exempted devices and the stored information of the device;
   an update means for updating the management data of a quarantine-exempted device to omit an inspection to allow communication in the business network when the determination means determines that the type of the device is quarantine-exempted; and
   wherein the data of definitions for types of quarantine-exempted devices includes information of request-essential ports which is designated as a request destination for communication and request-prohibited ports for which a request is prohibited for communication for each type of devices, the system further comprises an acquisition means for acquiring the communication log of the device omitting an inspection to allow communication in the business network;

and the determination means compares the communication log and the information of request-essential ports and request-prohibited ports, and cancels the setup that the device is dealt as quarantine-exempted, when there exists no log event in the communication log that the device requests communication to the business network with one of the request-essential ports, or there exists the log event in the communication log that the device requests communication to the business network with one of the request-prohibited ports.

* * * * *